US012212952B2

(12) United States Patent
Rosales et al.

(10) Patent No.: US 12,212,952 B2
(45) Date of Patent: Jan. 28, 2025

(54) GENERATION OF SPATIAL SOUND SIGNAL FROM AUDITORY PERSPECTIVE OF INDIVIDUAL

(71) Applicant: Intel Corporation, Santa Clara, CA (US)

(72) Inventors: Rafael Rosales, Bavaria (DE); Ignacio Alvarez, Portland, OR (US); Willem Beltman, West Linn, OR (US)

(73) Assignee: Intel Corporation, Santa Clara, CA (US)

( * ) Notice: Subject to any disclaimer, the term of this patent is extended or adjusted under 35 U.S.C. 154(b) by 190 days.

(21) Appl. No.: 18/146,562

(22) Filed: Dec. 27, 2022

(65) Prior Publication Data

US 2024/0214759 A1  Jun. 27, 2024

(51) Int. Cl.
*H04S 7/00* (2006.01)
*G06F 3/16* (2006.01)

(52) U.S. Cl.
CPC .............. *H04S 7/303* (2013.01); *G06F 3/165* (2013.01); *H04S 2400/11* (2013.01); *H04S 2400/15* (2013.01); *H04S 2420/01* (2013.01)

(58) Field of Classification Search
CPC .. H04S 7/303; H04S 2400/11; H04S 2400/15; H04S 2420/01; G06F 3/165
USPC ........................................................ 381/303
See application file for complete search history.

(56) References Cited

U.S. PATENT DOCUMENTS

| 2011/0196522 A1* | 8/2011 | Zakirov | H04S 7/305 |
| | | | 700/94 |
| 2022/0147563 A1* | 5/2022 | Perumalla | G06F 16/638 |

FOREIGN PATENT DOCUMENTS

| WO | WO-2023083918 A1 * | 5/2023 | ........... G10L 19/008 |
| WO | WO-2023083921 A1 * | 5/2023 | ........... G10L 19/008 |

OTHER PUBLICATIONS

T. Dupre, et al., "Spatial Sound Design in a Car Cockpit: Challenges and Perspectives," 2021 Immersive and 3D Audio: from Architecture to Automotive (I3DA), IEEE, 5 pgs., 2021.
D. Beattie, et al., "What's Around the Corner? Enhancing Driver Awareness in Autonomous Vehicles via In-Vehicle Spatial Auditory Displays," Research Gate, 11 pgs., Oct. 2014.

* cited by examiner

*Primary Examiner* — Sean H Nguyen
(74) *Attorney, Agent, or Firm* — Banner & Witcoff Ltd.

(57) ABSTRACT

An apparatus, including: an interface operable to receive real-time information related to one or more actors in a real environment; and processing circuitry operable to: generate a digital twin of the real environment, wherein the digital twin is a virtual representation of the real environment; spawn a model that mirrors the one or more actors based on the real-time information; and generate a spatial sound signal based on the digital twin for transmission to an ego actor of the one or more actors in the real environment, wherein the generation of the spatial sound signal comprises generating the spatial sound signal to be individualized from an auditory perspective of the ego actor in the real environment to originate from a source actor of the one or more actors.

25 Claims, 14 Drawing Sheets

100A
Environment with Traffic Actors

100B
Environment with Traffic Actors

400
Proximity Criteria
for Source Actor Relevance

500
Trajectory Criteria
for Source Actor Relevance

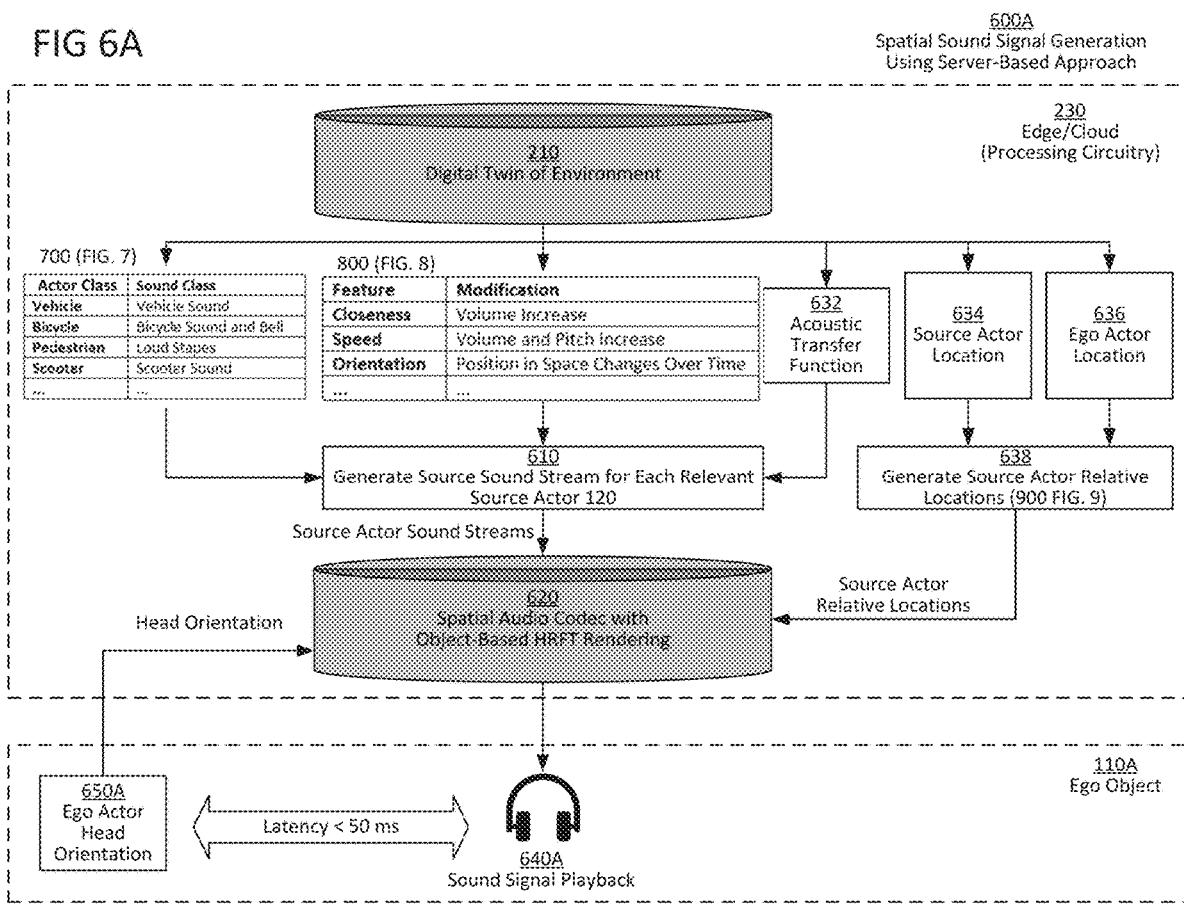

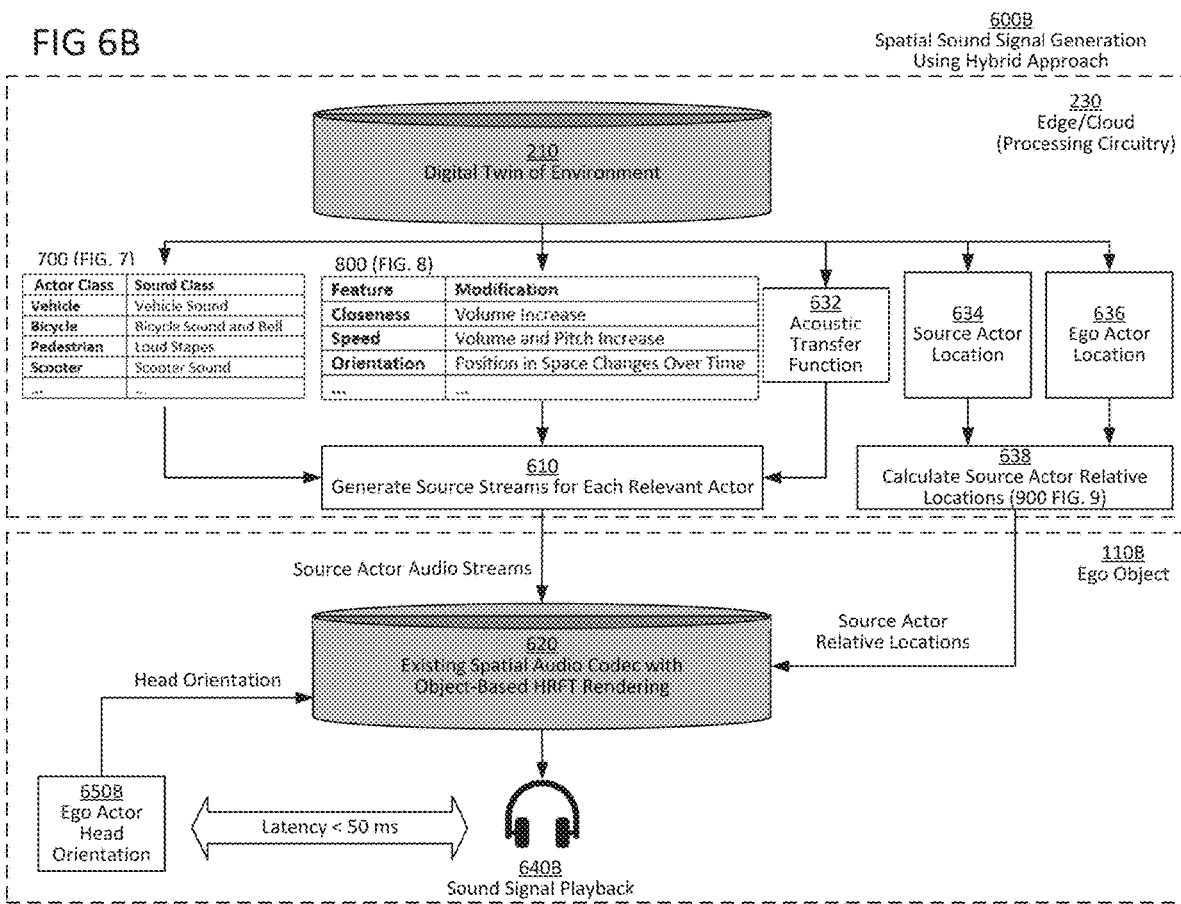

FIG 7

| Actor Class | Sound Class |
|---|---|
| Vehicle | Vehicle Sound |
| Bicycle | Bicycle Sound and Bell |
| Pedestrian | Loud Stapes |
| Scooter | Scooter Sound |
| ... | ... |

700
Static Sound Mapping Table

FIG 8

| Feature | Modification |
|---|---|
| Closeness | Volume Increase |
| Speed | Volume and Pitch Increase |
| Orientation | Position in Space Changes Over Time |
| ... | ... |

800
Situation-Dependent
Sound Modification Table

FIG 9

| Example Acoustic Transfer Function | Effect |
|---|---|
| Listener Behind Window | Attenuate Frequencies |
| Listener Wearing Helmut | Attenuate All Frequencies Significantly |
| ... | ... |

900
Environment-Dependent
Sound Modification Table

1000
Example Scenario

| FIG 10A (First Actor Detection 1000A) |
| FIG 10B (Second Actor Detection 1000B) |
| FIG 10C (Spatial Sound Generation for First Actor 1000C) |
| FIG 10D (Spatial Sound Generation for Second Actor 1000D) |

Top row (first actor, second actor, and digital twin) of FIG 10A repeated in FIGs 10B-10D for reference

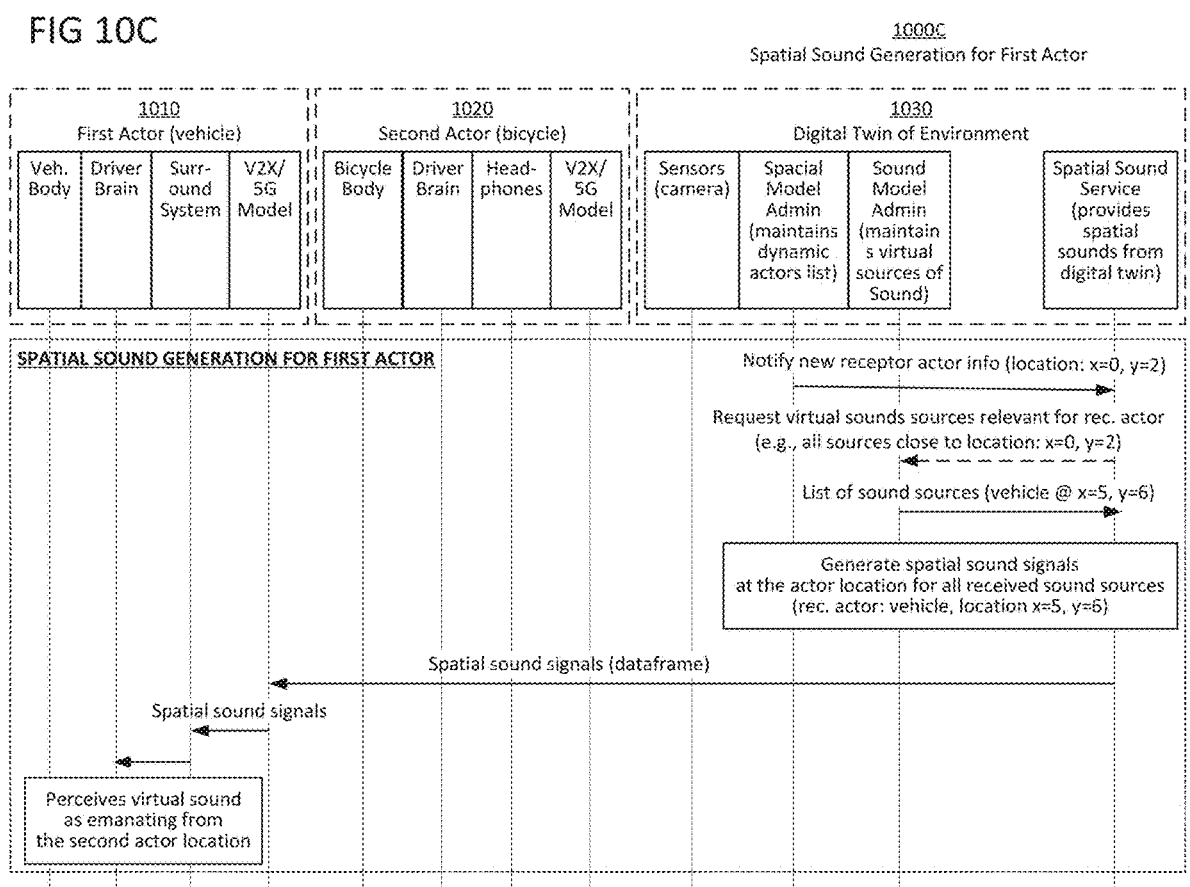

GENERATION OF SPATIAL SOUND SIGNAL FROM AUDITORY PERSPECTIVE OF INDIVIDUAL

TECHNICAL FIELD

Aspects described herein relate to generation of a spatial sound signal and, more particularly, to generation of a spatial sound signal from an audio perspective of an individual in a real environment.

BACKGROUND

Modern transportation systems are multimodal with a combination of loud and quiet actors (e.g., pedestrians, vehicles, bicycles, scooters . . . ). Crowded and loud environments pose a challenge for pedestrians in identifying potential collisions due to general noise exceeding that produced by specific actors.

BRIEF DESCRIPTION OF THE DRAWINGS

FIGS. 6A and 6B illustrate process flow diagrams of spatial sound signal generation in accordance with aspects of the disclosure.

FIG. 7 illustrates a static sound mapping table in accordance with aspects of the disclosure.

FIG. 8 illustrates a situation-dependent sound modification table in accordance with aspects of the disclosure.

FIG. 9 illustrates an environment-dependent sound modification table in accordance with aspects of the disclosure.

DESCRIPTION OF THE ASPECTS

The present disclosure is directed to generation of a spatial sound signal that is based on a digital twin of a real environment, wherein the digital twin spawns a model that mirrors actors in the real environment. The spatial sound signal is transmitted in the real environment to a playback receiver of an ego actor, and is individualized from an auditory perspective of the ego actor to originate in the real environment from a source actor.

I. Overview

Figure 1A:
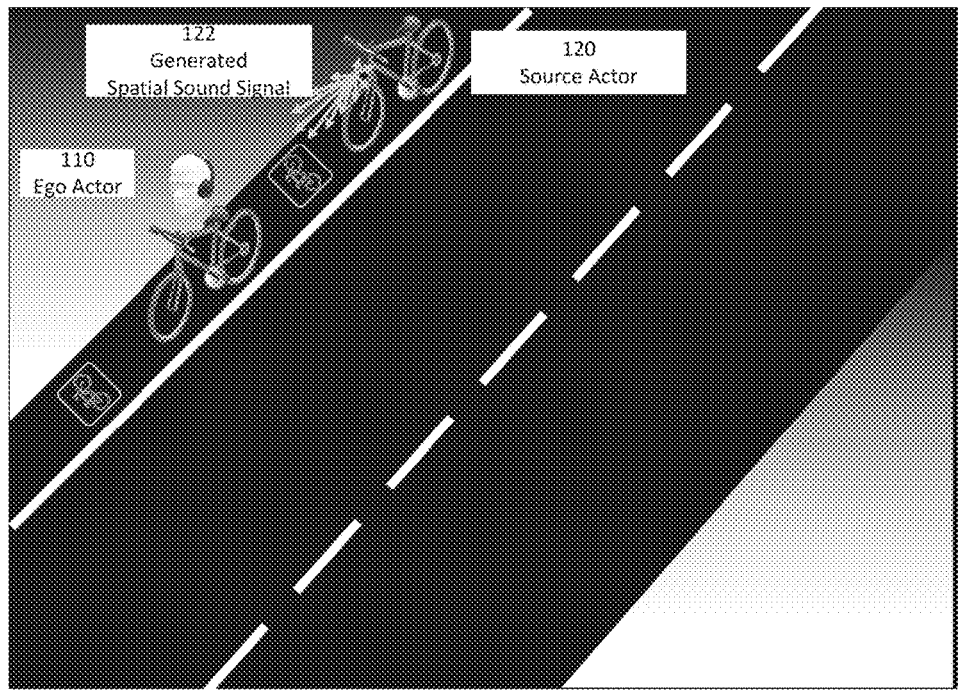
FIGS. 1A and 1B illustrate schematic diagrams of an environment with traffic actors in accordance with aspects of the disclosure.
Figure 1B:
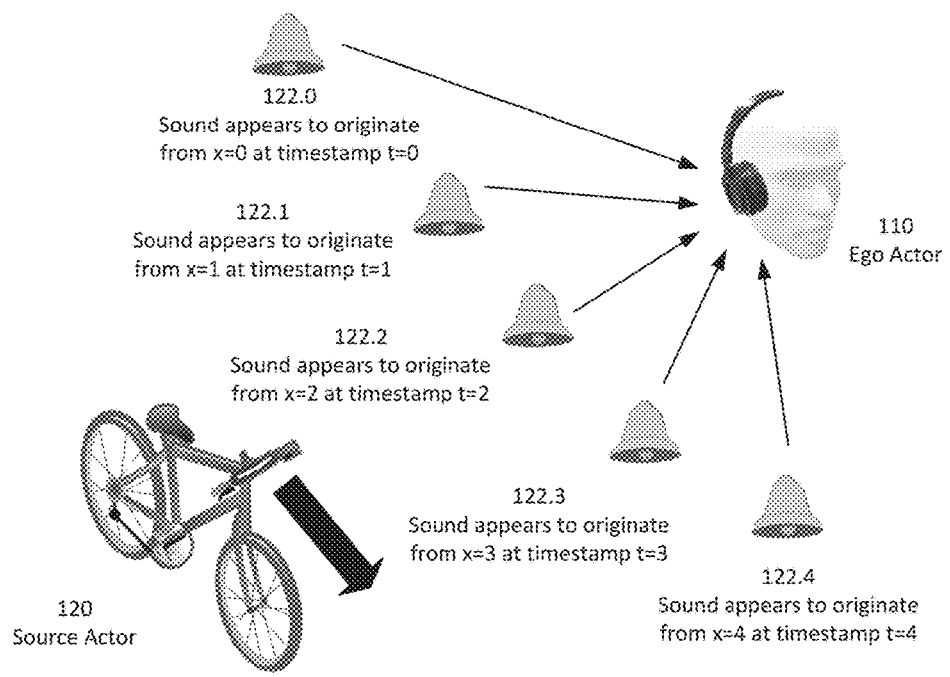

FIGS. 1A and 1B illustrate schematic diagrams of a traffic environment 100 with actors 110, 120 in accordance with aspects of the disclosure.

The term "actor" may refer to a pedestrian, driver, cyclist, or other participant in a transportation environment. An "actor" or "traffic actor" or "road actor" is any agent in a monitored environment. An "agent" is an actor that is classified as an independent decision-making entity (e.g., vehicle, pedestrian, bicyclist, motorbike, etc.). An "object" is more generic and may include dynamic objects (actors or agents) and static objects within a shared environment. Examples of static objects include parked vehicles, and boxes in the middle of a road.

The traffic environment 100 shown includes an ego actor 110 and a source actor 120, which in this example are bicyclists. The source actor 120 is a perceived source of a transmitted sound signal (e.g., ringing bell). The ego actor 110 has a playback receiver (e.g., headphones) to receive the sound signal. The traffic environment 100 is monitored to generate a digital twin model.

The digital twin model of the traffic environment 100 generates a simulated spatial sound signals 122 that are individualized from an auditory perspective of the ego actor 110 to originate in the real environment from a source actor 120. The spatial sound signals 122 are individualized based on the ego actor's 110 relative position and orientation as compared to the source actor 120. The source actor 120, interpreted as a source of the spatial sound signal 122, is mapped to the real-world coordinates through spatial audio technology, which leverages the digital twin model for a realistic generation of spatial sound signal 122. This individualization enables the ego actor 110 to identify a real three-dimensional location of the source 120 of each spatial sound signal 122 so as to enhance the ego actor's 110 awareness of the source actor 120 as a potential safety threat.

The example spatial sound signal 122 shown is a ringing bell, which appears from a perspective of the ego actor 110 to be passing the ego actor 110. More specifically, at time 0 the source actor's 120 ringing bell appears to be located at position 0, then at time 1 at position 1, at time 2 at position 2, at time 3 at position 3, and finally at time 4 at position 4. The playback of the ringing bell provides an immersive, low cognitive load, and realistic auditory input so that the generated sound signals 122 is locatable in a real three-dimensional environment to improve safety.

Figure 2:
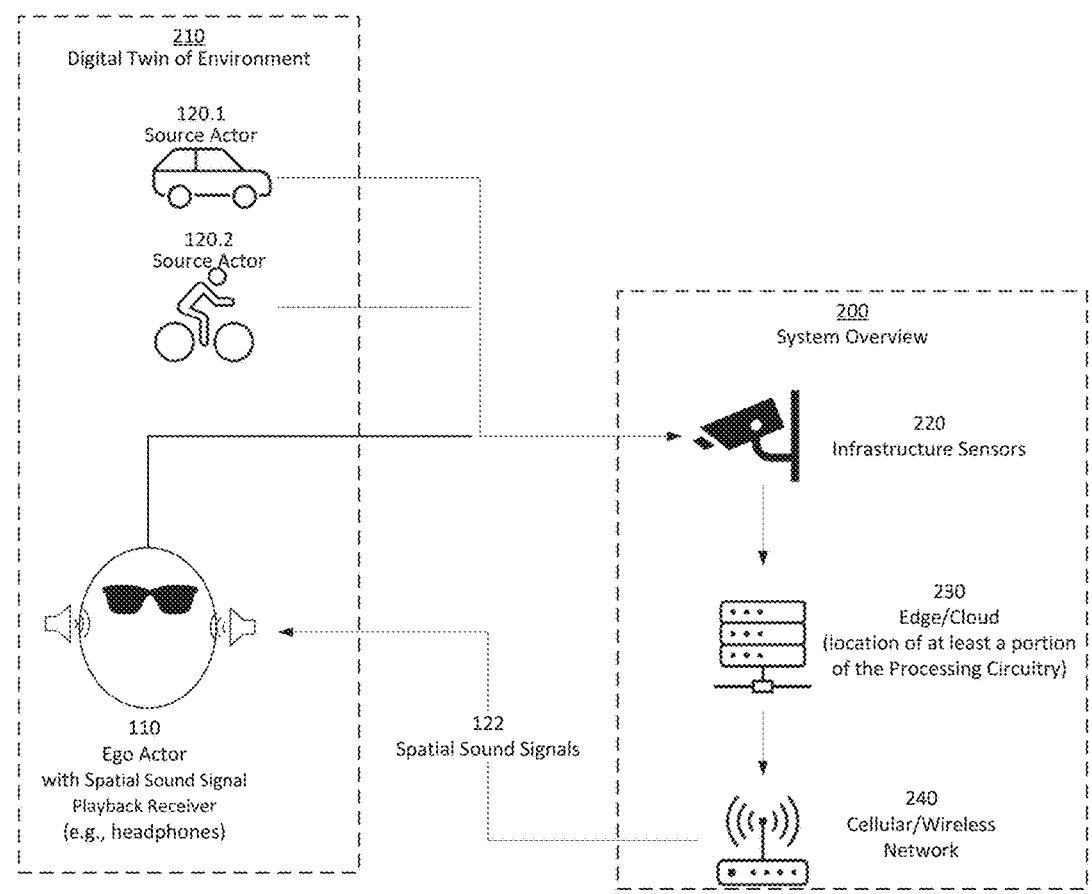
FIG. 2 illustrates a schematic diagram of an overview of a system in accordance with aspects of the disclosure.

FIG. 2 illustrates a schematic diagram of an overview of a system 200 in accordance with aspects of the disclosure.

The system 200 comprises infrastructure sensors 220, edge/cloud 230 where at least a portion of processing circuitry may be located, and a cellular/wireless network 240. Throughout this disclosure the processing circuitry and/or the edge/cloud may be referred to with reference numeral 230, it is understood that at least a portion of the processing circuitry may be located elsewhere.

The infrastructure sensors 220 are generally edge resources that sense locations and trajectories of potential source actors 120 and the ego actor 110 to provide to the edge/cloud 230 input information found in known digital twin models. This information may comprise location, speed, and class of dynamic actors (agents or objects) in the environment. The information may be obtained from an existing digital twin service, such as those created from vehicle-to-everything (V2X) and/or the infrastructure sensors 220.

The processing circuitry in the edge/cloud 230 generates the digital twin 210, which is a simulated environment that reproduces real world features of an environment of a serviced geographic location. The digital twin 210 spawns models that mirror actors (e.g., vehicles, pedestrians, etc.) in the real environment or environmental conditions (e.g., weather or light). These models are initialized based on real environment sensor inputs from the infrastructure sensors 220. For example, a camera may image a pedestrian in a location, so the digital twin spawns a pedestrian model with detected attributes, such as an elderly female walking slowly, or a middle-aged man jogging. The models themselves have intelligence built into them (i.e., kinematics and behaviors) that can be used to predict future events. The models also receive updates from the infrastructure sensors 220 to provide real-time corrections that improve the accuracy of the digital twin 210. In some instances, the digital twin 210 is generated with high accuracy and includes rendered visual representations mirroring roads, buildings, green scenery, and even light conditions, for example. In other instances, the digital twin 210 is an abstracted representation of these features while maintaining high accuracy (e.g., traffic lanes and sidewalks). The digital twin 210 may be any number of dimensions, such as three-dimensions.

The processing circuitry 230 generates a spatial sound signal 122 that is based on the digital twin 210, and transmits the spatial sound signal 122 via the cellular/wireless network 240 in the real environment to a playback receiver of the ego actor 110. Again, the spatial sound signal 122 is individualized from an auditory perspective of the ego actor 110 to originate in the real environment from a source actor 120.

II. Spatial Sound Signals

Figure 3:
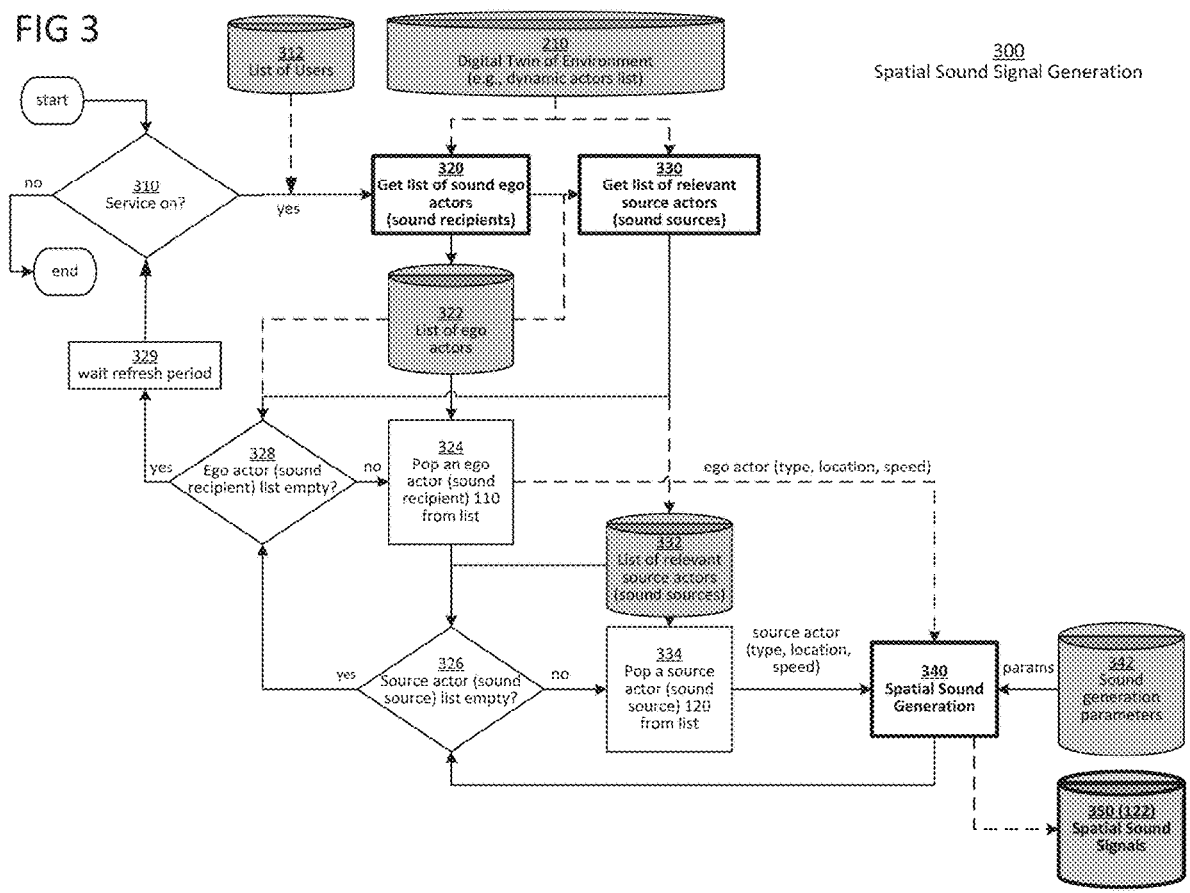
FIG. 3 illustrates a flow diagram of spatial sound signal generation in accordance with aspects of the disclosure.

FIG. 3 illustrates a flow diagram of spatial sound signal generation 300 in accordance with aspects of the disclosure.

By way of overview, spatial sound signal generation 300 comprises obtaining a list of ego actors 110 (i.e., sound recipients) (Step 320) and a list of relevant source actors 120 (i.e., sound sources) (Step 330) to identify pairs of source and ego actors, and then generating a spatial sound signal 122 corresponding to each of those source-ego actor pairs (Step 340).

More specifically, if service is on (Step 310), the processing circuitry 230 obtains an ego actor list (322) based on a list of subscribed users 312 and the digital twin 210 (Step 322), which has a dynamic actors list. Also, the processing circuitry 230 obtains a list of source actors 120 (i.e., sound sources) (Step 332) based on the list of subscribed users 312 and the digital twin 210 (Step 330).

If the ego actor list 322 is not empty (Step 328), the processing circuitry 230 pops an ego actor 110 from the list of ego actors 322. And if the source actor list 332 is not empty (Step 326), the processing circuitry pops an source actor 120 from the list 332. (Step 334).

The processing circuitry 230 than generates a spatial sound signal 350 (122) based on the popped ego actor 110 and the popped source actor 120 (Step 340). The spatial sound signal generation (Step 340) is based on each of the ego actor's 110 and source actor's 120 type, location, and speed, and based on sound generation parameters 342, which are discussed further below.

Not every dynamic actor will be an ego actor 110 that receives a spatial sound signal 350/122. The spatial sound signal transmissions are limited to subscribed users 312 that form part of a relevant source-ego actor pair. The computations to simulate spatial sound signals 122 to be perceived by the ego actor 110 locations is limited to active registered users 312. An active user may be identified by a match between a dynamic agent in the digital twin 210 and a broadcasted signal by an agent of its presence at a particular location.

A. Identification of Spatial Sound Signal Parameters
1. Relevant Sound Sources The processing circuitry 230 identifies dynamic source actor locations, speed, and class types from the digital twin 210 for the generation of spatial sound signals 122. Not necessarily all actors are considered for sound synthesis; this avoids sensory overload of the ego actor 110, as well as irrelevant sound computations.

To determine if a source actor 120 is relevant to a particular ego actor 110, the processing circuitry 230 considers an actor's proximity and trajectory.

a. Proximity

Figure 4:
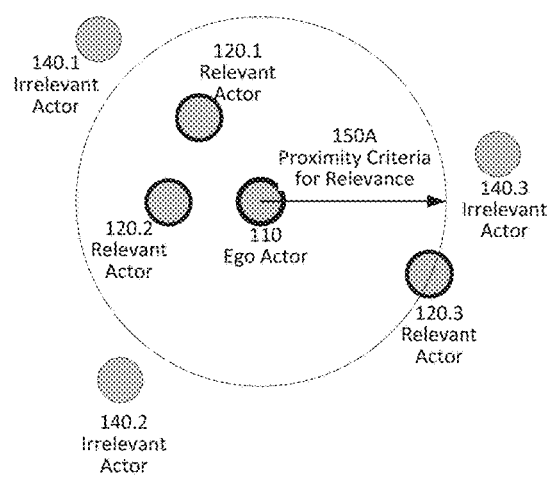
FIG. 4 illustrates a schematic diagram of proximity criteria for source actor relevance in accordance with aspects of the disclosure.

FIG. 4 illustrates a schematic diagram 400 of proximity criteria for source actor relevance in accordance with aspects of the disclosure.

The processing circuitry 230 is operable to determine which of the source actors 120 is relevant based on proximity of a potential source actor 120 relative to the ego actor 110. The proximity is defined by the proximity criteria for relevance circle 150A. Actors 120 (120.1-120.3), which are located on or within the relevance circle 150A, are relevant as source actors 120. Actors 140 (140.1-140.3), which are located outside the relevance circle 150A, are irrelevant.

A relevant sound source is any actor of a given type (e.g., a bicycle 120.1) that is located within relevance circle 150 (e.g., 50 meters) from a particular ego actor 110 (e.g., pedestrian) as a sound recipient. The same bicycle would not be relevant for another pedestrian at a further distance (e.g., 300 meters). The class of the object dictates the parameterizable threshold, for example, a fast-moving vehicle has a different distance threshold than a slow-moving bicycle.

b. Trajectory

Figure 5:
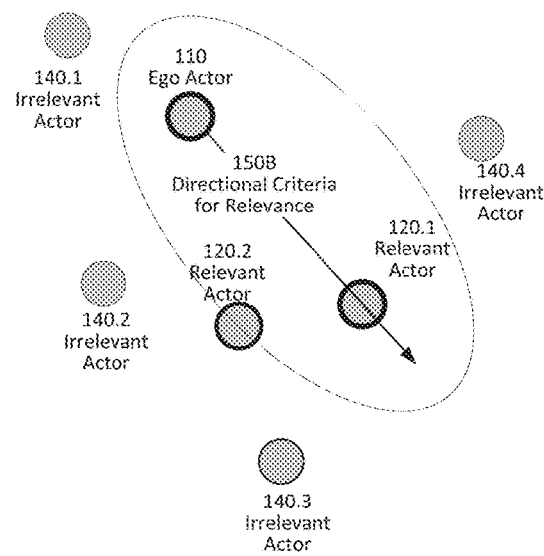
FIG. 5 illustrates a schematic diagram of trajectory criteria for source actor relevance in accordance with aspects of the disclosure.

FIG. 5 illustrates a schematic diagram 500 of trajectory criteria for source actor relevance in accordance with aspects of the disclosure.

Additionally or alternatively to proximity, the processing circuitry 230 is operable to determine which of the source actors 120 is relevant based on trajectory of the potential source actors 120 relative to the ego actor 110. The proximity is defined by the proximity criteria for relevance oval 150B. Actors 120 (120.1-120.2), which are located on or within the relevance oval 150B, are relevant source actors 120. Actors 140 (140.1-140.4), which are located outside the relevance oval 150B, are irrelevant.

Speed and direction of an agent influences its relevance. If an agent is not moving, it is not relevant and thus not necessary to generate a warning sound. For example, if a vehicle is not approaching a motorcycle, a synthetic spatial sound signal of the vehicle is not relevant.

B. Spatial Sound Signal Generation

FIGS. 6A and 6B illustrate process flow diagrams 900 of spatial sound signal generation in accordance with aspects of the disclosure.

FIG. 6A illustrates a process flow diagram of a server-based approach 600A for spatial sound signal generation.

The processing circuitry 230 first accesses the list of relevant actors. For each of the actors, a class is specified and a corresponding sound source file is assigned (see FIGS. 7 and 8, Tables 700 and 800). Modifications are then applied to each of these sounds to account for modifications such as proximity, speed and orientation, and additionally, an acoustic transfer function 632 that may be applied. After this stage, a source sound stream is available for each of the actors (Step 610).

FIG. 7 illustrates a static sound mapping table 700 for the spatial sound generation in accordance with aspects of the disclosure. In generating a spatial sound signal 122, the sounds are first selected from a table 700 that maps object class to sound classes.

FIG. 8 illustrates a situation-dependent sound modification table 800 for the spatial sound generation in accordance with aspects of the disclosure. The sound class from FIG. 7 may be further modified according to the situation. For example, a fast-moving electric scooter produces a more noticeable sound than one that is slow-moving.

The location of each source actor location (Step 634) and the ego actor location (Step 636) are then used to calculate the relative position of each source actor 120 with respect to the ego actor 110 (Step 638). FIG. 9 illustrates an environment-dependent sound modification table 900 for the spatial sound generation in accordance with aspects of the disclosure. The digital twin 210 of the environment may spawn a model to process the spatial sound signal using an acoustic transfer function that models an obstruction, reflection, or attenuation effect of a feature of the real environment based on information from the digital twin. For example, if a person is seated at a restaurant close to the window, sound signals from the exterior are much more attenuated than if there were no window. An acoustic transfer function may be subsequently applied to the sound source to simulate such an obstruction, reflection and/or attenuation effect based on information from the digital twin 210. The actual calculation of such an acoustic transfer function 632 may be based on simple point source models, or more complex numerical or neural network models.

The ego actor's 110 head orientation 650A is measured on the playback device 640 of the ego actor 110, and the orientation is sent to the processing circuitry, which in this example is located in the edge/cloud 230. The source sound streams, and the relative locations of each source actor 120 and the head orientation 650 are fed into a known spatial audio codec 620 with actor based rendering. The codec 620 renders each of the sources with the appropriate head-related transfer function (HRTF) and generates a binaural (stereo) source sound signal 122 that is then sent to the playback device 640 of the ego actor 110 device for playback.

Spatial sound is comprised of a set of sound signals that are perceived by a human listener's ears. The spatial sound signals 122 are encoded to imitate a transfer function of the human head (i.e., HRTF) so a human listener can identify a source direction of the sound. For example, a sound to the right of a person travels first into the right ear, then through the bones to the left ear. Such spatial sound rendering is based on a location of sound sources over time, a location of a sound recipient over time, a head orientation of the sound recipient over time, and an acoustic sound source strength and frequency characteristics over time.

FIG. 6B illustrates a process flow diagram of a hybrid approach 600B for spatial sound signal generation.

A limitation of the server approach of FIG. 6A is the 50 ms latency target between head orientation 650A and sound playback. Because the head orientation is measured on the local playback device 640A and then a corresponding signal is sent to the edge/cloud 230, a significant portion of the latency budget may be consumed. Typically a round trip latency of less than 50 ms is used between an actual head rotation and the playing of an updates to the spatial sound signal 122.

Rather than sending the head rotation signal up to the processing circuitry at the edge/cloud 230 and calculating the signals there before sending them to the playback device 640A as illustrated in FIG. 6A, an alternative, more efficient method is the hybrid approach illustrated in FIG. 6B. The head rotation effect is measured and calculated in a similar manner, locally on the playback device 640B to improve latency. The ego actor location, source actor locations, and source spatial sound signals 122 are transmitted to the local playback device 640B. The signals 122 are then fed into a local object based spatial audio codec to generate a binaural signal with HRTF rendering based on the source actor locations, sound source signals, ego actor location, and observed head orientation 650B.

The acoustic rendering latency is less sensitive to location as compared to head rotation, as it is a slower effect. The computation is done locally, there is no round trip latency. The bandwidth of the signal to the local playback device 640B may increase because now multiple audio streams are sent, rather than the single binaural/stereo signal.

C. Communication of Generated Spatial Sound Signals from the Edge/Cloud

The spatial sound signals 122 specific for each listener are transmitted via any available wireless communication channel such as the cellular network to all active users. There is no limitation to the types of wireless communication channel.

D. Spatial Sound Signal Playback Receiver

Example devices to receive the spatial sound signal may comprise, but are not limited to, bone conduction speakers, audio sunglasses, helmets, and/or car spatial/surround system. Wearable devices and vehicles already enable users to enjoy spatial audio, and upcoming augmented/virtual reality (AR/VR) and multiverse devices will increase their ubiquity. The use of spatial audio codecs is now mainstream, enabling the implementation of the digital twin model in an effective way.

III. Example Scenario

Figure 10:
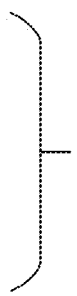
FIG. 10 (FIGS. 10A-10D) illustrates a signal flow diagram of an example scenario in accordance with aspects of the disclosure.

FIG. 10 (FIGS. 10A-10D) illustrates a signal flow diagram of an example scenario 1000 (1000A-1000D) in accordance with aspects of the disclosure.

Figure 10A:
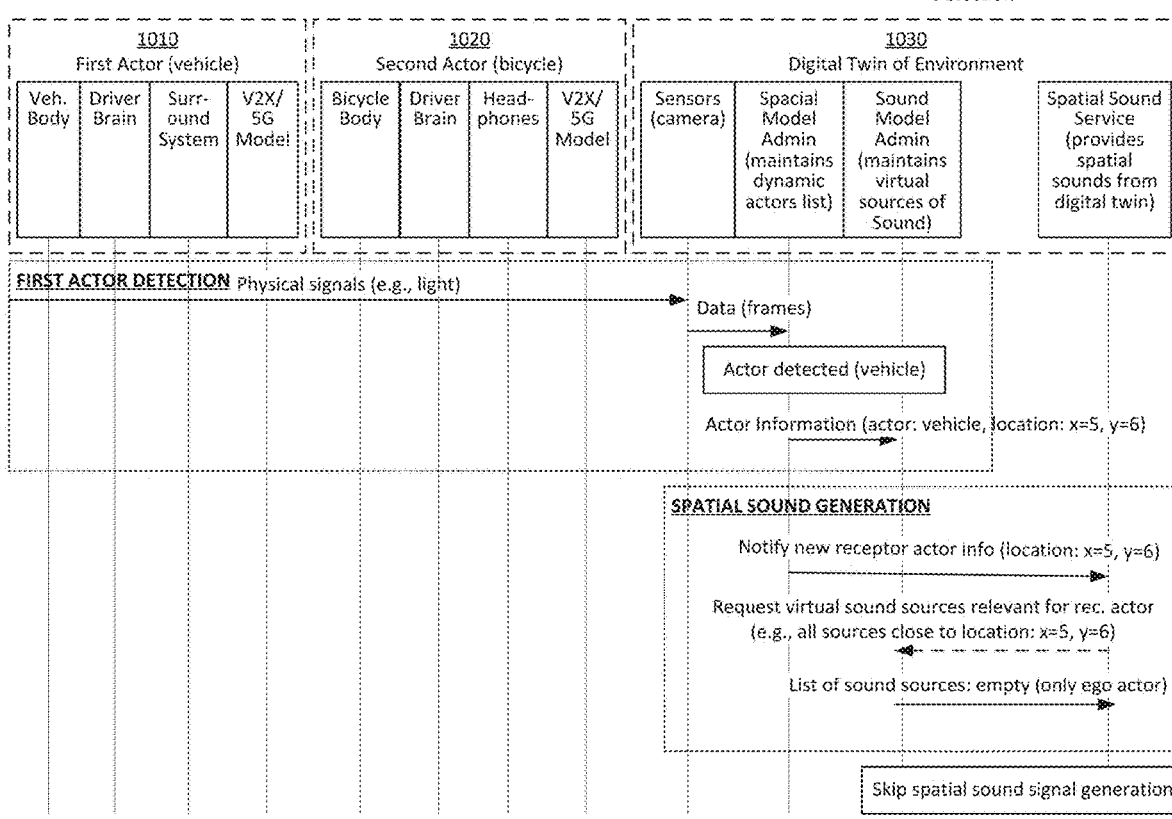
Figure 10B:
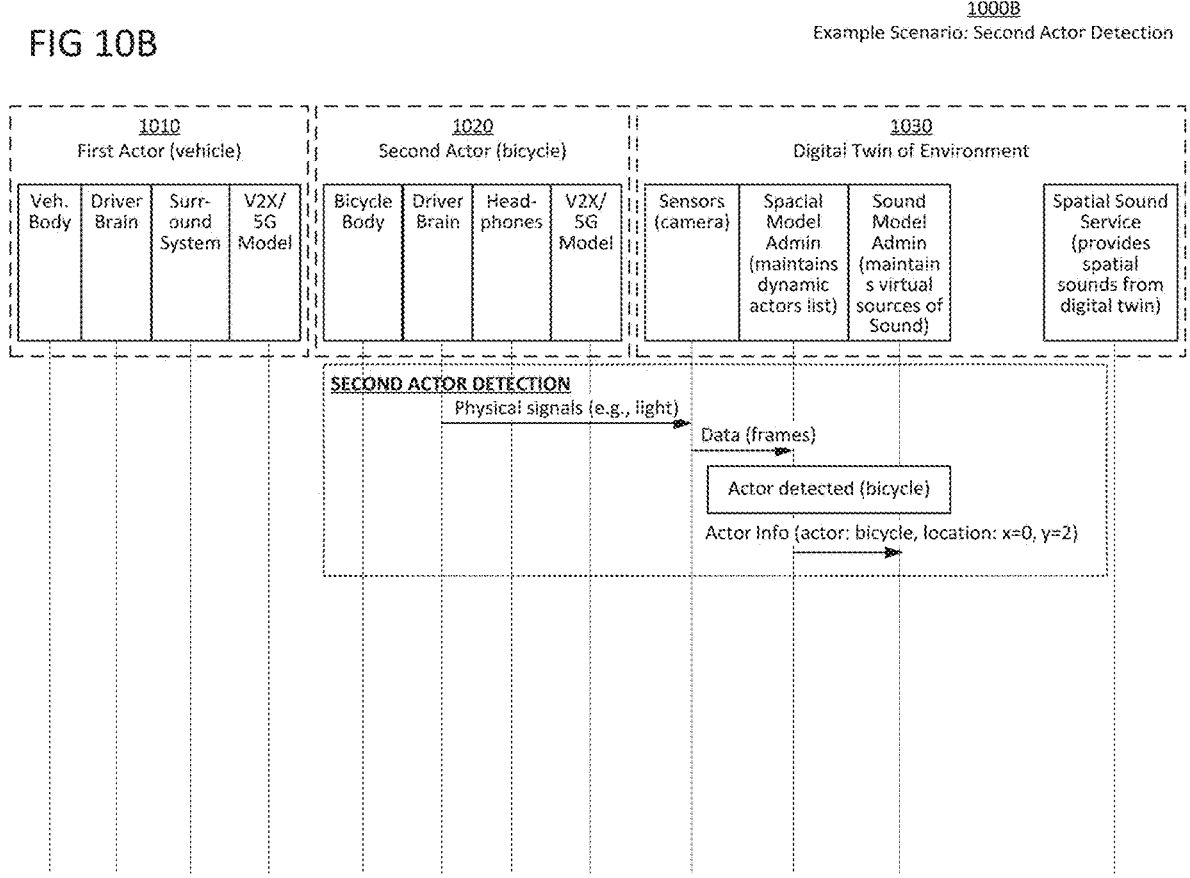
Figure 10D:
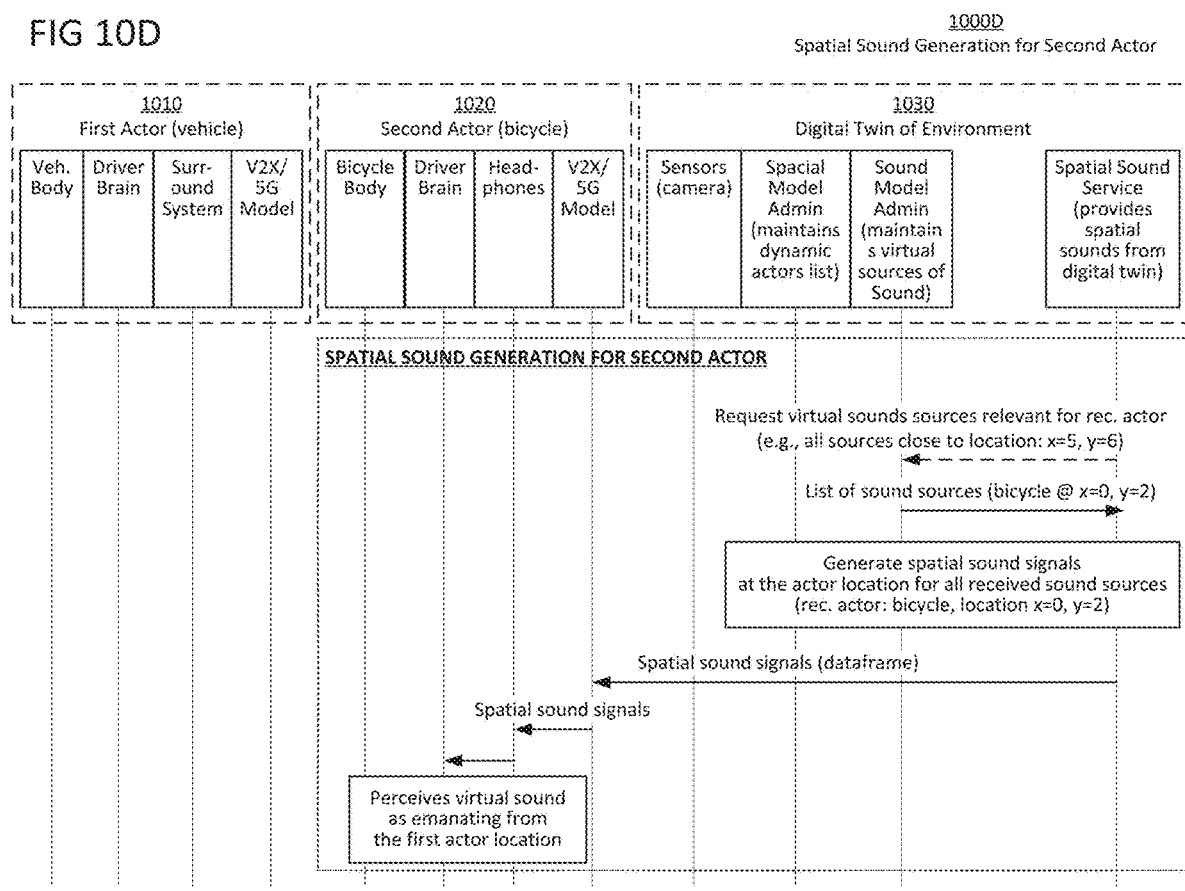

FIG. 10A illustrates a signal flow diagram 1000A of first actor detection. FIG. 10B illustrates a signal flow diagram 1000B of second actor detection. FIG. 10C illustrates a signal flow diagram 1000C of spatial sound signal generation for the first actor. FIG. 10D illustrates a signal flow diagram 1000D of spatial sound signal generation for the second actor. The top rows (i.e., first actor, second actor, and digital twin) of FIG. 10A are repeated in FIGS. 10B-10D for reference.

In this example, a first actor 1010 is a vehicle, and a second actor 1020 is a bicycle 1020, which are perceived in the digital twin 1030. The actors 1010, 1020 are identified and added to a list of sources of virtual sound. Each actor 1010, 1020 subscribed to the service is provided with spatial sound signals that are generated artificially to appear to originate from an actual location of surrounding actors from an ego actor's perspective through spatial audio technology. The virtual sounds are generated to enhance environmental awareness, thus sound characteristics such as volume, timbre, doppler effect, etc., are customized to each situation, that is, for each pair of sound source—sound destination.

FIGS. 10A-10D are detailed enough to provide an understanding of the example. For the sake of brevity, these details are not repeated here.

IV. Computing Device

Figure 11:
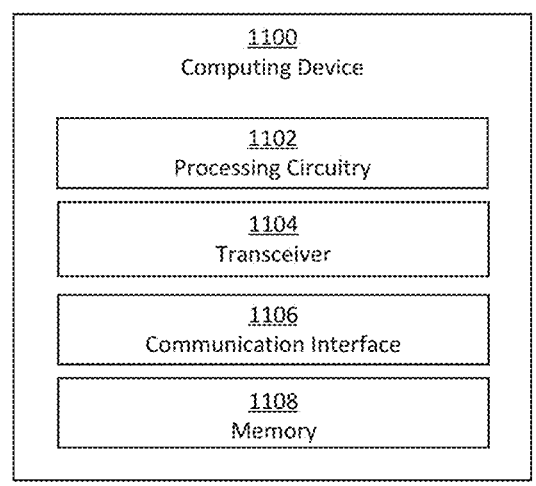
FIG. 11 illustrates a block diagram of a computing device in accordance with aspects of the disclosure

FIG. 11 illustrates a block diagram of a computing device 1100 in accordance with aspects of the disclosure. The computing device 1100 may be identified with a central controller and be implemented as any suitable network infrastructure component, which may be implemented as a cloud/edge network server, controller, computing device, etc. The computing device 1100 may serve the processing circuitry 230 in accordance with the various techniques as discussed herein. To do so, the computing device 1100 may include processing circuitry 1102, a transceiver 1104, communication interface 1106, and a memory 1108. The components shown in FIG. 11 are provided for ease of explanation, and the computing device 1100 may implement additional, less, or alternative components as those shown in FIG. 11.

The processing circuitry 1102 may be operable as any suitable number and/or type of computer processors, which may function to control the computing device 1100. The processing circuitry 1102 may be identified with one or more processors (or suitable portions thereof) implemented by the computing device 1100. The processing circuitry 1102 may be identified with one or more processors such as a host processor, a digital signal processor, one or more microprocessors, graphics processors, baseband processors, microcontrollers, an application-specific integrated circuit (ASIC), part (or the entirety of) a field-programmable gate array (FPGA), etc.

In any event, the processing circuitry 1102 may be operable to carry out instructions to perform arithmetical, logical, and/or input/output (I/O) operations, and/or to control the operation of one or more components of computing device 1100 to perform various functions as described herein. The processing circuitry 1102 may include one or more microprocessor cores, memory registers, buffers, clocks, etc., and may generate electronic control signals associated with the components of the computing device 1100 to control and/or modify the operation of these components. The processing circuitry 1102 may communicate with and/or control functions associated with the transceiver 1104, the communication interface 1106, and/or the memory 1108. The processing circuitry 1102 may additionally perform various operations to control the communications, communications scheduling, and/or operation of other network infrastructure components that are communicatively coupled to the computing device 1100.

The transceiver 1104 may be implemented as any suitable number and/or type of components operable to transmit and/or receive data packets and/or wireless signals in accordance with any suitable number and/or type of communication protocols. The transceiver 1104 may include any suitable type of components to facilitate this functionality, including components associated with known transceiver, transmitter, and/or receiver operation, configurations, and implementations. Although depicted in FIG. 11 as a transceiver, the transceiver 1104 may include any suitable number of transmitters, receivers, or combinations of these that may be integrated into a single transceiver or as multiple transceivers or transceiver modules. The transceiver 1104 may include components typically identified with a radio frequency (RF) front end and include, for example, antennas, ports, power amplifiers (PAs), RF filters, mixers, local oscillators (LOs), low noise amplifiers (LNAs), up-converters, down-converters, channel tuners, etc.

The communication interface 1106 may be operable as any suitable number and/or type of components operable to facilitate the transceiver 1104 receiving and/or transmitting data and/or signals in accordance with one or more communication protocols, as discussed herein. The communication interface 1106 may be implemented as any suitable number and/or type of components that function to interface with the transceiver 1104, such as analog-to-digital converters (ADCs), digital to analog converters, intermediate frequency (IF) amplifiers and/or filters, modulators, demodulators, baseband processors, etc. The communication interface 1106 may thus work in conjunction with the transceiver 1104 and form part of an overall communication circuitry implemented by the computing device 1100, which may be implemented via the computing device 1100 to transmit commands and/or control signals to execute any of the functions describe herein.

The memory 1108 is operable to store data and/or instructions such that, when the instructions are executed by the processing circuitry 1102, cause the computing device 1100 to perform various functions as described herein. The memory 1108 may be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 1108 may be non-removable, removable, or a combination. The memory 1108 may be implemented as a non-transitory computer readable medium storing one or more executable instructions such as, for example, logic, algorithms, code, etc.

As further discussed below, the instructions, logic, code, etc., stored in the memory 1108 are represented by the various modules/engines as shown in FIG. 11. Alternatively, if implemented via hardware, the modules/engines shown in FIG. 11 associated with the memory 1108 may include instructions and/or code to facilitate control and/or monitor the operation of such hardware components. In other words, the modules/engines as shown in FIG. 11 are provided for ease of explanation regarding the functional association between hardware and software components. Thus, the processing circuitry 1102 may execute the instructions stored in these respective modules/engines in conjunction with one or more hardware components to perform the various functions as discussed herein.

V. Artificial Intelligence/Machine Learning

Various aspects described herein may utilize one or more machine learning models. The term "model" as, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may be used during an inference phase to make predictions or decisions based on input data. In some aspects, the trained machine learning model may be used to generate additional training data. An additional machine learning model may be adjusted during a second training phase based on the generated additional training data. A trained additional machine learning model may be used during an inference phase to make predictions or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including the inputs and the corresponding outputs (illustratively, each input may be associated with a desired or expected output for that input). Each training instance may include one or more inputs and a desired output. Training may include iterating through training instances and using an objective function to teach the model to predict the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data and the like. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

The aspects disclosed herein provide enhanced awareness of the environment for road users through auditory perception, thereby increasing safety. Furthermore, the distraction factor is much lower than visual feedback which requires changing visual focus to a screen area.

The aspects of this disclosure are not limited to transportation environments; the aspects are also applicable to other environments, such as manufacturing environments wherein the actors may be robots and factories workers.

The techniques of this disclosure may also be described in the following examples.

Example 1. An apparatus, comprising: an interface operable to receive real-time information related to one or more actors in a real environment; and processing circuitry operable to: generate a digital twin of the real environment, wherein the digital twin is a virtual representation of the real environment; spawn a model that mirrors the one or more actors based on the real-time information; and generate a spatial sound signal based on the digital twin for transmission to an ego actor of the one or more actors in the real environment, wherein the generation of the spatial sound signal comprises generating the spatial sound signal to be individualized from an auditory perspective of the ego actor in the real environment to originate from a source actor of the one or more actors.

Example 2. The apparatus of example 1, wherein the processing circuitry is further operable to: identify the source action from the one or more actors based on actor location.

Example 3. The apparatus of any one or more of examples 1-2, wherein the processing circuitry is further operable to: determine which of the one or more actors is relevant to the ego actor to form a source-ego actor pair with the ego actor, wherein the generation of the spatial sound signal comprises generating the spatial sound signal for the source-ego actor pairs.

Example 4. The apparatus of any one or more of examples 1-3, wherein the processing circuitry is further operable to: determine which of the one or more actors is relevant based on proximity or trajectory of the one or more actors relative to the ego actor.

Example 5. The apparatus of any one or more of examples 1-4, wherein the real environment is a traffic environment, and the ego actor is a traffic participant or the playback receiver of the traffic participant.

Example 6. The apparatus of any one or more of examples 1-5, wherein the real environment is a factory environment, and the ego actor is a factory worker or the playback receiver of the factory worker.

Example 7. The apparatus of any one or more of examples 1-6, wherein the processing circuitry is further operable to: transmit the spatial sound signal to the playback receiver of the ego actor via a wireless communication channel.

Example 8. The apparatus of any one or more of examples 1-7, wherein the processing circuitry is further operable to: process the spatial sound signal using an acoustic transfer function that models an obstruction, reflection, or attenuation effect of a feature of the real environment based on information from the digital twin.

Example 9. The apparatus of any one or more of examples 1-8, wherein the processing circuitry is further operable to: process the spatial sound signal using a head-related transfer function (HRTF) to immerse the ego actor in the spatial sound signal.

Example 10. The apparatus of any one or more of examples 1-9, wherein at least a portion of the processing circuitry operable to process the spatial sound signal using the HRTF is located at the playback receiver of the ego actor.

Example 11. The apparatus of any one or more of examples 1-10, wherein at least a portion of the processing circuitry operable to process the spatial sound signal using the HRTF is located at the edge.

Example 12. The apparatus of any one or more of examples 1-11, wherein the processing circuitry is operable to: transmit the spatial sound signal to a playback receiver of the ego actor.

Example 13. A component of a system, comprising: processing circuitry; and a non-transitory computer-readable storage medium including instructions that, when executed by the processing circuitry, cause the processing circuitry to: receive real-time information related to one or more; generate a digital twin of the real environment, wherein the digital twin is a virtual representation of the real environment, and based on the real-time information, spawns a model that mirrors the one or more actors in a real environment; and generate a spatial sound signal for transmission to an ego actor of the one or more actors in the real environment, wherein the generation of the spatial sound signal comprises generating the spatial sound signal to be individualized from an auditory perspective of the ego actor in the real environment to originate from a source actor of the one or more actors.

Example 14. The component of example 13, wherein the instructions further cause the processing circuitry to: identify the source action from the one or more actors based on actor location.

Example 15. The component of any one or more of examples 13-14, wherein the instructions further cause the processing circuitry to: determine which of the one or more actors is relevant to the ego actor to form a source-ego actor pair with the ego actor, wherein the generation of the spatial sound signal comprises generating the spatial sound signal for the source-ego actor pairs.

Example 16. The component of any one or more of examples 13-15, wherein the instructions further cause the processing circuitry to: determine which of the one or more actors is relevant based on proximity or trajectory of the one or more actors relative to the ego actor.

Example 17. The component of any one or more of examples 13-16, wherein the real environment is a traffic environment, and the ego actor is a traffic participant or the playback receiver of the traffic participant.

Example 18. The component of any one or more of examples 13-17, wherein the real environment is a factory environment, and the ego actor is a factory worker or the playback receiver of the factory worker.

Example 19. The component of any one or more of examples 13-18, wherein the instructions further cause the processing circuitry to: transmit the spatial sound signal to the playback receiver of the ego actor via a wireless communication channel.

Example 20. The component of any one or more of examples 13-19, wherein the instructions further cause the processing circuitry to: process the spatial sound signal using an acoustic transfer function that models an obstruction, reflection, or attenuation effect of a feature of the real environment based on information from the digital twin.

Example 21. The component of any one or more of examples 13-20, wherein the instructions further cause the processing circuitry to: process the spatial sound signal using a head-related transfer function (HRTF) to immerse the ego actor in the spatial sound signal.

Example 22. The component of any one or more of examples 13-21, wherein the instructions further cause at least a portion of the processing circuitry to process the spatial sound signal using the HRTF is located at the playback receiver of the ego actor.

Example 23. The component of any one or more of examples 13-22, wherein the instructions further cause at least a portion of the processing circuitry to process the spatial sound signal using the HRTF is located at the edge.

Example 24. The component of any one or more of examples 13-23, wherein the instructions further cause the processing circuitry to: transmit the spatial sound signal to a playback receiver of the ego actor.

Example 25. An apparatus, comprising: an interface means for receiving real-time information related to one or more actors in a real environment; and processing circuitry means for: generating a digital twin of the real environment, wherein the digital twin is a virtual representation of the real environment; spawning a model that mirrors the one or more actors based on the real-time information; and generating a spatial sound signal based on the digital twin for transmission to an ego actor of the one or more actors in the real environment, wherein the generating the spatial sound signal comprises generating the spatial sound signal to be individualized from an auditory perspective of the ego actor in the real environment to originate from a source actor of the one or more actors.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. An apparatus, comprising:
an interface operable to receive real-time information related to one or more actors in a real environment; and
processing circuitry operable to:
    generate a digital twin of the real environment, wherein the digital twin is a virtual representation of the real environment;
    spawn a model that mirrors the one or more actors based on the real-time information; and
    generate a spatial sound signal based on the digital twin for transmission to an ego actor of the one or more actors in the real environment,
    wherein the generation of the spatial sound signal comprises generating the spatial sound signal to be individualized from an auditory perspective of the ego actor in the real environment to originate from a source actor of the one or more actors.

2. The apparatus of claim 1, wherein the processing circuitry is further operable to: identify the source action from the one or more actors based on actor location.

3. The apparatus of claim 1, wherein the processing circuitry is further operable to:
    determine which of the one or more actors is relevant to the ego actor to form a source-ego actor pair with the ego actor,
    wherein the generation of the spatial sound signal comprises generating the spatial sound signal for the source-ego actor pairs.

4. The apparatus of claim 3, wherein the processing circuitry is further operable to:
    determine which of the one or more actors is relevant based on proximity or trajectory of the one or more actors relative to the ego actor.

5. The apparatus of claim 1, wherein the real environment is a traffic environment, and the ego actor is a traffic participant or the playback receiver of the traffic participant.

6. The apparatus of claim 1, wherein the real environment is a factory environment, and the ego actor is a factory worker or the playback receiver of the factory worker.

7. The apparatus of claim 1, wherein the processing circuitry is further operable to:
transmit the spatial sound signal to the playback receiver of the ego actor via a wireless communication channel.

8. The apparatus of claim 1, wherein the processing circuitry is further operable to:
process the spatial sound signal using an acoustic transfer function that models an obstruction, reflection, or attenuation effect of a feature of the real environment based on information from the digital twin.

9. The apparatus of claim 1, wherein the processing circuitry is further operable to:
process the spatial sound signal using a head-related transfer function (HRTF) to immerse the ego actor in the spatial sound signal.

10. The apparatus of claim 9, wherein at least a portion of the processing circuitry operable to process the spatial sound signal using the HRTF is located at the playback receiver of the ego actor.

11. The apparatus of claim 9, wherein at least a portion of the processing circuitry operable to process the spatial sound signal using the HRTF is located at the edge.

12. The apparatus of claim 1, wherein the processing circuitry is operable to:
transmit the spatial sound signal to a playback receiver of the ego actor.

13. A component of a system, comprising:
processing circuitry; and
a non-transitory computer-readable storage medium including instructions that, when executed by the processing circuitry, cause the processing circuitry to:
receive real-time information related to one or more;
generate a digital twin of the real environment, wherein the digital twin is a virtual representation of the real environment, and based on the real-time information, spawns a model that mirrors the one or more actors in a real environment; and
generate a spatial sound signal for transmission to an ego actor of the one or more actors in the real environment,
wherein the generation of the spatial sound signal comprises generating the spatial sound signal to be individualized from an auditory perspective of the ego actor in the real environment to originate from a source actor of the one or more actors.

14. The component of claim 13, wherein the instructions further cause the processing circuitry to:
identify the source action from the one or more actors based on actor location.

15. The component of claim 13, wherein the instructions further cause the processing circuitry to:
determine which of the one or more actors is relevant to the ego actor to form a source-ego actor pair with the ego actor,
wherein the generation of the spatial sound signal comprises generating the spatial sound signal for the source-ego actor pairs.

16. The component of claim 15, wherein the instructions further cause the processing circuitry to:
determine which of the one or more actors is relevant based on proximity or trajectory of the one or more actors relative to the ego actor.

17. The component of claim 13, wherein the real environment is a traffic environment, and the ego actor is a traffic participant or the playback receiver of the traffic participant.

18. The component of claim 13, wherein the real environment is a factory environment, and the ego actor is a factory worker or the playback receiver of the factory worker.

19. The component of claim 13, wherein the instructions further cause the processing circuitry to:
transmit the spatial sound signal to the playback receiver of the ego actor via a wireless communication channel.

20. The component of claim 13, wherein the instructions further cause the processing circuitry to:
process the spatial sound signal using an acoustic transfer function that models an obstruction, reflection, or attenuation effect of a feature of the real environment based on information from the digital twin.

21. The component of claim 13, wherein the instructions further cause the processing circuitry to:
process the spatial sound signal using a head-related transfer function (HRTF) to immerse the ego actor in the spatial sound signal.

22. The component of claim 21, wherein the instructions further cause at least a portion of the processing circuitry to process the spatial sound signal using the HRTF is located at the playback receiver of the ego actor.

23. The component of claim 21, wherein the instructions further cause at least a portion of the processing circuitry to process the spatial sound signal using the HRTF is located at the edge.

24. The component of claim 13, wherein the instructions further cause the processing circuitry to:
transmit the spatial sound signal to a playback receiver of the ego actor.

25. An apparatus, comprising:
an interface means for receiving real-time information related to one or more actors in a real environment; and
processing circuitry means for:
generating a digital twin of the real environment, wherein the digital twin is a virtual representation of the real environment;
spawning a model that mirrors the one or more actors based on the real-time information; and
generating a spatial sound signal based on the digital twin for transmission to an ego actor of the one or more actors in the real environment,
wherein the generating the spatial sound signal comprises generating the spatial sound signal to be individualized from an auditory perspective of the ego actor in the real environment to originate from a source actor of the one or more actors.

* * * * *